United States Patent Office 2,750,422
Patented June 12, 1956

2,750,422

TRIOL OF LEVOPIMARIC ACID—MALEIC ANHYDRIDE ADDUCT

Thomas F. Sanderson, Wilmington, Del., assignor to Hercules Powder Company, Wilmington, Del., a corporation of Delaware No Drawing. Application April 13, 1955, Serial No. 501,169

2 Claims. (Cl. 260—617)

This invention relates to novel alcohols that may be prepared from levopimaric acid and more specifically it relates to isomeric triols obtainable by the reduction of an adduct of levopimaric acid and an ethylene dicarboxylic acid.

It is well known that levopimaric acid and maleic anhydride will react to form a product melting at about 226–229° C. which has been shown to be an adduct having the formula

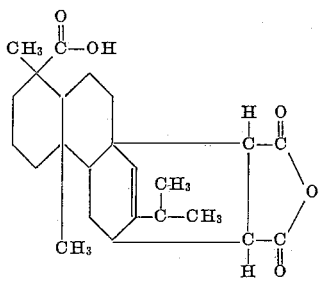

A description of the adduct and one process of preparation are described in U. S. Patent 2,409,930 to R. F. B. Cox.

It is also well known that the above adduct of levopimaric acid and maleic anhydride can be converted to an adduct of levopimaric acid and fumaric acid by heating in aqueous alkaline medium. This adduct has the following formula:

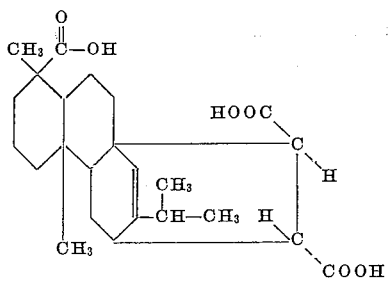

and is described in U. S. Patent 2,517,563 to G. C. Harris.

In accordance with the present invention, it has been found that the above-described adducts can be reduced by means of an alkali metal aluminum hydride to produce new and useful isomeric triols having the following formulae:

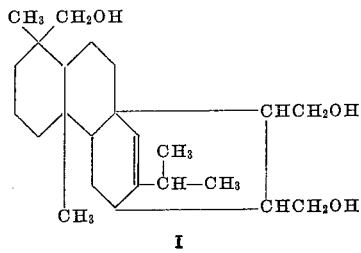

I

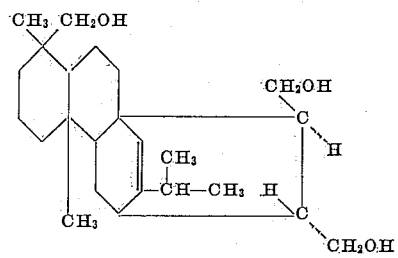

II

The following example is presented as a further illustration of the invention. Parts and percentages are by weight unless otherwise specified.

Example

The adduct of levopimaric acid and maleic acid was prepared according to the procedure of U. S. 2,409,930. In a reaction vessel there was placed a suspension of 4 parts of lithium aluminum hydride in 90.0 parts of ethyl ether. To this suspension there was added 9.2 parts of the adduct and the resulting mixture was stirred at room temperature for a period of 7 days. Thereafter, 7.7 parts ethyl acetate was added dropwise to decompose excess lithium aluminum hydride. When visible reaction had subsided, the lithium aluminum complex was destroyed by the addition of 20% hydrochloric acid until two clear layers were obtained. The layers were separated and the nonaqueous layer washed first with dilute acid and then with water. The nonaqueous layer was then dried over sodium sulfate and then evaporated to dryness yielding 7.2 parts of a solid residue. To insure complete reduction of the adduct, the residue was treated again with lithium aluminum hydride by the procedure just described yielding 4.3 parts of residue. Two recrystallizations from acetone gave a crystalline product melting at 168–170° C. which was identified as the triol of Formula I above. Analysis—calculated for $C_{24}H_{40}O_3$: C, 76.55, H, 10.71; found: C, 76.43, H, 10.59.

The novel triols of the invention can be prepared as illustrated above by the reduction with an alkali metal aluminum hydride of the adduct of levopimaric acid and an ethylene dicarboxylic acid. Although the examples illustrate only the triol resulting from the reduction of the adduct of levopimaric acid and maleic anhydride, it is obvious that the levopimaric acid-fumaric acid adduct may be treated similarly to produce an isomeric triol. As starting materials, it is also possible to utilize mono-, di- or tri-esters of the adducts.

The reduction of the adduct with the alkali metal aluminum hydride is generally carried out in solution. Any inert organic solvent may be used as the medium for the reaction, provided that it is a solvent for either one or both of the reactants. Suitable solvents that can be used are diethyl ether, di-n-butyl ether, dioxane, tetrahydrofuran, diethyl carbitol, benzene, hexane, toluene, etc. The reaction should be carried out under anhydrous conditions in order to avoid hydrolysis of the hydride and reduction in the yields thereby. Any alkali metal aluminum hydride, such as lithium, sodium, etc., aluminum hydrides may be used for the reduction of the adduct to the triol but lithium aluminum hydride is preferred. The amount of alkali metal aluminum hydride is preferably within the ratio of from about 0.5 to about 10 moles per mole of adduct and, more preferably, is from about 1 to about 5 moles per mole of adduct. In general, the reaction is carried out at a temperature of from about 0° C. to 50° C. and preferably at a temperature of from about 15° C. to about 35° C.

The alkali metal aluminum complex which is formed as an intermediate in the reaction is hydrolyzed by the addition of water, an acid or a base. Suitable acids for this purpose are the mineral acids such as sulfuric acid, phosphoric acid, etc., but an alkali metal hydroxide such as sodium hydroxide, potassium hydroxide, etc., may be used with equivalent results. The concentration of the hydrolytic agent may be varied over a wide range since water alone can be used, but in general if an acid or base is used, the concentration will be within the range of from about 5% to about 25% by weight of the adduct. The hydrolysis readily takes place at room temperature, and elevated temperatures are not required but may be used.

The method by which the triol is separated from the reaction mixture will, of course, depend upon the type of solvent used for carrying out the reaction. If a water-immiscible solvent is used for the reduction reaction, in which solvent the triol is soluble, the triol will then be present in the organic phase and can be separated from that phase by removal of the solvent. It may also be separated from the reaction mixture by extraction with a suitable water-immiscible solvent such as, for example, ethyl benzene, toluene, hexane, etc. It is a crystalline solid and may be purified by crystallization procedures.

The new triols produced in accordance with this invention can be esterified by reaction with an acyl anhydride or an acyl halide as, for example, acetic anhydride, propionic anhydride, phthalic anhydride, ketene, acetyl chloride, benzoyl chloride, etc. Thus, it is possible to produce any aliphatic, cycloaliphatic, aryl aliphatic or aromatic acid ester of these important new alcohols. The esterification reaction is generally carried out in an organic solvent that is a solvent for the triols. The temperature employed may be varied over a wide range and will depend upon the acylating agent used.

The new triols of this invention are valuable intermediates for the preparation of synthetic materials. They are particularly important in the synthesis of monobasic acid esters, which esters can be used as plasticizers, particularly for cellulose esters and ethers.

The triols of the invention can also be utilized in the preparation of polymeric esters which are prepared by reaction of the triols with polybasic acids and they may also be reacted with ethylene oxide to produce valuable polymeric ethers having surface-active properties.

The triols of the invention are also useful for imparting delayed tack properties to neoprene adhesives. As illustrative, the triol produced in the example was mixed with a 15% solution of neoprene in toluene in the weight ratios of 1:1, 2:1 and 3:1 (neoprene to triol) and cast into films. All of the films containing triol showed crystals of the triol interspersed throughout and were not tacky to touch. A blank film, which contained no triol, was tacky after standing 17 hours. All of the films were warmed enough to flux the crystals of those containing the triol and then strips of papers pressed on the melts. After standing for 24 hours, the paper strips were peeled away from the films. The film prepared from the blank released the paper strip easily, whereas the films containing the triol adhered firmly to the paper. The best result was shown by the sample having a 3:1 ratio of neoprene to triol.

What I claim and desire to protect by Letters Patent is:
1. The isomeric compounds of the formula

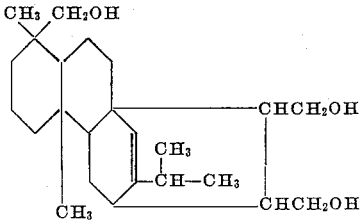

2. The process which comprises reducing an adduct of levopimaric acid and an ethylene dicarboxylic acid by means of an alkali metal aluminum hydride, and recovering a compound having the formula:

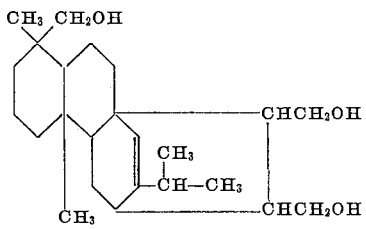

as a product of the reaction.

References Cited in the file of this patent
UNITED STATES PATENTS

| | | |
|---|---|---|
| 2,409,930 | Cox | Oct. 22, 1946 |
| 2,517,563 | Harris | Aug. 8, 1950 |

OTHER REFERENCES

Kloetzel: Organic Reactions, vol. 4 (1948), pg. 25 (1 pg. only).

Brown: Organic Reactions, vol. 6 (1951), pgs. 478, 504 (2 pgs.).